US008311954B2

(12) United States Patent
Ning et al.

(10) Patent No.: US 8,311,954 B2
(45) Date of Patent: Nov. 13, 2012

(54) RECOVERY OF 3D HUMAN POSE BY JOINTLY LEARNING METRICS AND MIXTURES OF EXPERTS

(75) Inventors: Huazhong Ning, Urbana, IL (US); Wei Xu, Los Gatos, CA (US); Yihong Gong, Saratoga, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 952 days.

(21) Appl. No.: 12/277,284

(22) Filed: Nov. 24, 2008

(65) Prior Publication Data

US 2010/0049675 A1 Feb. 25, 2010

Related U.S. Application Data

(60) Provisional application No. 60/991,067, filed on Nov. 29, 2007.

(51) Int. Cl.
*G06F 15/18* (2006.01)
*G06K 9/62* (2006.01)
(52) U.S. Cl. .......................................... 706/12; 382/159
(58) Field of Classification Search .................. None
See application file for complete search history.

(56) References Cited

U.S. PATENT DOCUMENTS 7,940,960 B2 * 5/2011 Okada ........................... 382/103

OTHER PUBLICATIONS

Kim, Sungho et al.; "Object Recognition Using a Generalized Robust Invariant Feature and Gestalt's Law of Proximity and Similarity"; 2006; IEEE; Conference on Computer Vision and Pattern Recognition Workshop; 8 pages.*
Agarwal, Ankur et al.; "Learning Methods for Recovering 3D Human Pose from Monocular Images"; 2004; Institut national De REcherche en Informatique et en Automatique; pp. 1-22.*
Stein, Andrew et al.; "Incorporating Background Invariance into Feature-Based Object Recognition"; 2005; IEEE; Workshop on Applications of Computer Vision; 8 pages.*
Bissacco, Alessandro et al.; "Fast Human Pose Estimation using Appearance and Motion via Multi-Dimensional Boosting Regression"; 2007; IEEE; 8 pages.*
Ning, Huazhong et al.; "Discriminative Learning of Visual Words for 3D Human Pose Estimation"; 2008; IEEE; 8 pages.*
Agarwal et al, Recovering 3D Human Pose from Moncular Images, IEEE Transactions on Pattern Analysis and Machine Intelligence, Jan. 2006 (vol. 28 No. 1).
Bishop et al, Bayesian Hierarchical Mixtures of Experts, Uncertainty in Artificial Intelligenece, Proceedings of Nineteeth Conference, 2003.
Fei-Fei et al, A Bayesian Hierarchical Model for learning Natural Scene Categories, 2005.
Guo et al, Learning and Inference of 3D Human Poses from Gaussian Mixture Modeled Silhouettes, 18th Conference on Pattern Recognition, 2006.
Lowe, Distinctive Image Features from Scale-Invariant Keypoint, International Journal of Computer Vision, Jan. 5, 2004.

* cited by examiner

*Primary Examiner* — Jeffrey A Gaffin
*Assistant Examiner* — Stanley K Hill
(74) *Attorney, Agent, or Firm* — Joseph Kolodka; Bao Tran

(57) ABSTRACT

Systems and methods are disclosed for determining 3D human pose by generating an Appearance and Position Context (APC) local descriptor that achieves selectivity and invariance while requiring no background subtraction; jointly learning visual words and pose regressors in a supervised manner; and estimating the 3D human pose.

3 Claims, 5 Drawing Sheets

❑ $x$: image BoW (bag-of-words) representation
❑ $y$: human pose 131,468 images

Pose: 52 DOF 1 global orientation 17 joints

Boxing (S3)      Jogging (S1)

RECOVERY OF 3D HUMAN POSE BY JOINTLY LEARNING METRICS AND MIXTURES OF EXPERTS

The present invention claims priority to provisional application Ser. No. 60/991,067 filed on Nov. 29, 2007, the content of which is incorporated by reference.

BACKGROUND

Robust recovery of 3D human pose in monocular images or videos is an actively growing field. Effective solutions would lead to breakthroughs in a wide range of applications spanning visual surveillance, video indexing and retrieval, human-computer interfaces, and so on. The problem is challenging due to both the internal complexity of the articulated human body and the external variations of the scene. The internal complexity stems from the number of degrees of freedom in the human body, ambiguities of projection onto the image plane, varying body shape, self-occlusion, among others. The external variations include cluttered background, varying clothes, among others.

There are two general classes of approaches for human pose estimation: generative methods and discriminative methods. The generative methods recover the hidden states (human pose) within an analysis-by-synthesis loop. They are natural and flexible to represent the hidden states and appearance of the human body, but their applicability is partly prohibited by the high computational cost to infer the distribution on the hidden states and by the difficulties of constructing the observation models. These disadvantages have motivated the advent of discriminative methods that learn direct image-to-pose mappings by training on a dataset with labeled human poses. Compared to generative models, the discriminative models, once trained, have the advantage of much faster test speed, although in some cases they cannot obtain estimates as precise as generative methods do.

Among the image representations used by the discriminative methods, the bag-of-words model has been used. However, among the majority works to date, the bag of visual words are usually obtained by unsupervised clustering methods such as K-means. Visual words obtained this way actually capture the most common patterns in the entire training set, and are good features for coarse-grain recognition tasks such as object detection and classification. However, such representations may lack the needed power to discriminate subtle differences in recognition tasks such as pose estimation.

The generative methods construct observation likelihood or cost functions that compute how well the body configuration is aligned with the observation. Then complex sampling or nonlinear optimization methods are used to infer the likelihood peaks within an analysis-by-synthesis loop. And models of state priors or image statistics are learned by supervised or unsupervised procedures to help the pose estimation.

The discriminative methods usually have fast computational speed, while the estimates by the generative methods are often more precise. Therefore, researchers have attempted to combine both discriminative and generative methods and expect to explore the advantages of both. For example, a discriminative method to directly recover the model parameters can be done using a mixture of regressors. The recovered parameters are used to initialize a generative model for more detailed estimation. In, the discriminative model is tuned using samples from the generative model, and the generative model is optimized to produce inferences close to the ones predicted by the current discriminative model. Both the generative and the combinative methods require high computational cost in inference.

SUMMARY

Systems and methods are disclosed for determining 3D human pose by generating a local descriptor such as an Appearance and Position Context (APC) local descriptor that achieves selectivity and invariance while requiring no background subtraction; jointly learning visual words and pose regressors in a supervised manner; and estimating the 3D human pose.

In one embodiment, a supervised method learns the visual words for human pose estimation. Visual words are initially obtained by an unsupervised clustering algorithm, and then a separate metric for each visual word is derived from the labeled image-to-pose pairs through a supervised learning process. Bayesian mixtures of experts (BME) are used to represent the multi-modal distribution of the 3D human pose space conditioned on the feature space. The metric learning and the BME model are jointly optimized by an iterative gradient ascent algorithm.

In other embodiments, the visual words obtained by an unsupervised clustering method represent the general frequent patterns existing in all training images, and the visual words obtained by the supervised learning method capture the patterns that are particularly informative for pose estimation. In one embodiment, the learned distance metric implicitly transforms the visual word to a new space so that (1) it can better represent the local structures (e.g., bent elbow) useful for pose estimation; (2) it can suppress the unimportant dimensions of the visual words, especially the dimensions corresponding to background. When the background varies, these dimensions might introduce nontrivial errors if they are treated uniformly.

The bag-of-words approach heavily relies on the design of local image descriptors that possess such preferable features as high discriminative power and invariance to scale, rotation, illumination, and background to some extent. In one embodiment, a sparse and local image descriptor attempts to not only capture the spatial co-occurrence and context information of the local structure but also encode their relative spatial positions. These properties make the descriptor discriminative for the task of pose estimation.

Advantages of the preferred embodiment may include one or more of the following. The system provides discriminative power for those tasks which deal with subtle differences such as pose estimation. The Appearance and Position Context (APC) descriptor tolerates a range of scale and position variations because it is computed on small cells, instead of pixels. The APC local descriptor achieves both selectivity and invariance while requiring no background subtraction. The APC descriptor is superior to the shape context descriptor in that it requires no background subtraction and silhouette extraction. The APC descriptor also outperforms the SIFT descriptor. The system achieves fast computational speed thanks to the integral histograms used in APC descriptor extraction and fast inference of pose regressors. The system performs pose estimation by recognizing human actions in monocular videos without requiring precise estimates for each frame. The system learns an individual distance metric for each visual word to optimize the pose estimation performance. The learned metrics rescale the visual words to suppress unimportant dimensions such as those corresponding to background.

DESCRIPTION

Figure 1:
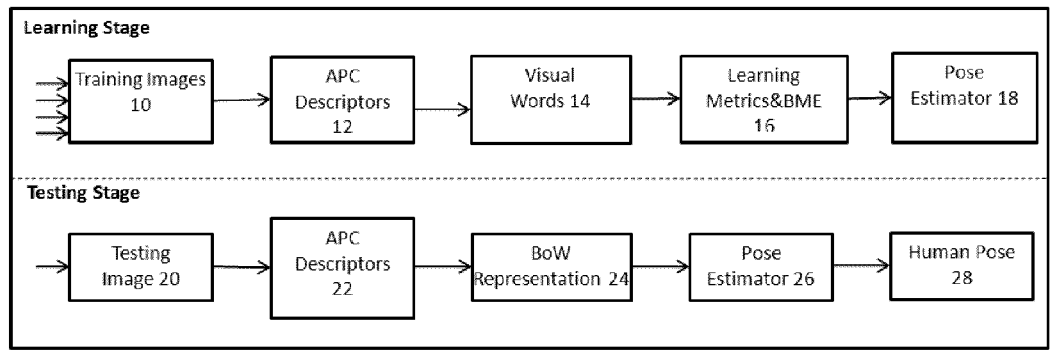
FIG. 1 shows an exemplary system to determine 3D human pose from a single monocular image.

Referring now to FIG. 1, an exemplary system to determine 3D human pose from a single monocular image, using a discriminative bag-of-words approach, is shown. The system of FIG. 1 has two stages: a learning stage and a testing stage. First, in the learning stage, training images 10 are provided to Appearance and Position Context (APC) descriptors 12. Next visual words 14 are obtained. The data is provided to learning metrics and a Bayesian mixture of experts (BME) 16. The output is then provided to a pose estimator 18.

During the testing stage, test images 20 are provided to extract APC descriptors 22. The data is processed by a bag-of-words (BoW) representation 24. A pose estimator 26 is provided to generate a human pose 28 as the output.

The system of FIG. 1 jointly learns the visual words 14 and the pose estimators 18 in a supervised manner. The learned metrics in 16 rescale the visual words to suppress unimportant dimensions that correspond to the background. The APC descriptor 12 (which is identically used as the descriptor 22 during the testing phase of FIG. 1) achieves both the discriminative power and the invariance while requiring no background subtraction and silhouette extraction.

The image descriptor 12 or 22 is a compact representation of an image that is expected to preserve both selectivity and invariance. A category of image descriptors commonly used in discriminative human pose estimation is dense holistic representations, like HOG in and block SIFT in (but not sparse SIFT). While it exhibits significant success at pose recovery, the dense representations require good alignment of the human region in the detection window. To address this issue, a bag of sparse local descriptors is used which is invariant to a wide range of translations and has achieved great success in object and natural scene categorization.

The bag-of-words representation 24 for human pose estimation 28 is resistant to a large misalignment of the human region in the detection window. This misalignment may pose difficulties to many other representations. The local descriptor 12 captures the subtle differences in pose estimation while requiring no background subtraction.

Most of the commonly used image descriptors for discriminative human pose estimation are either silhouette-based descriptors, such as bag of shape context descriptors, Gaussian mixture models of silhouette, and signed-distance functions on silhouette, or dense holistic features, such as block SIFT, HOG, hierarchical features, and Hu moments. These descriptors are successful, but the silhouette-based descriptors rely on accurate silhouette extraction, and the dense holistic features require alignment of human region in detection window. The bag-of-words representation 24 resists misalignment, and the APC descriptor 22 represents the subtle differences in pose estimation while requiring no background subtraction and silhouette extraction.

The discriminative methods learn direct image-to-pose mappings by training on labeled data. The learned mappings differ in the organization of training set and in the runtime hypothesis selection, varying from linear/nonlinear regression to the Bayesian mixture of experts, manifold embedding, nearest-neighbor retrieval from typical examples, mixture of probabilistic PCA (principal components analysis), and mixture of multilayer perceptrons for each pose cluster. The BME model is used as it has been verified to be able to accurately represent the multimodal image-to-pose distributions and also can be jointly optimized with the distance metric learning.

Appearance & Position Context Descriptor

With the human vision system, it is probable that human poses are recognized in 2D images by identifying the shapes and positions of the informative local structures (e.g., bent elbow, stretched arm, and lifted leg). An APC descriptor is implemented specifically for human pose estimation.

Figure 2:
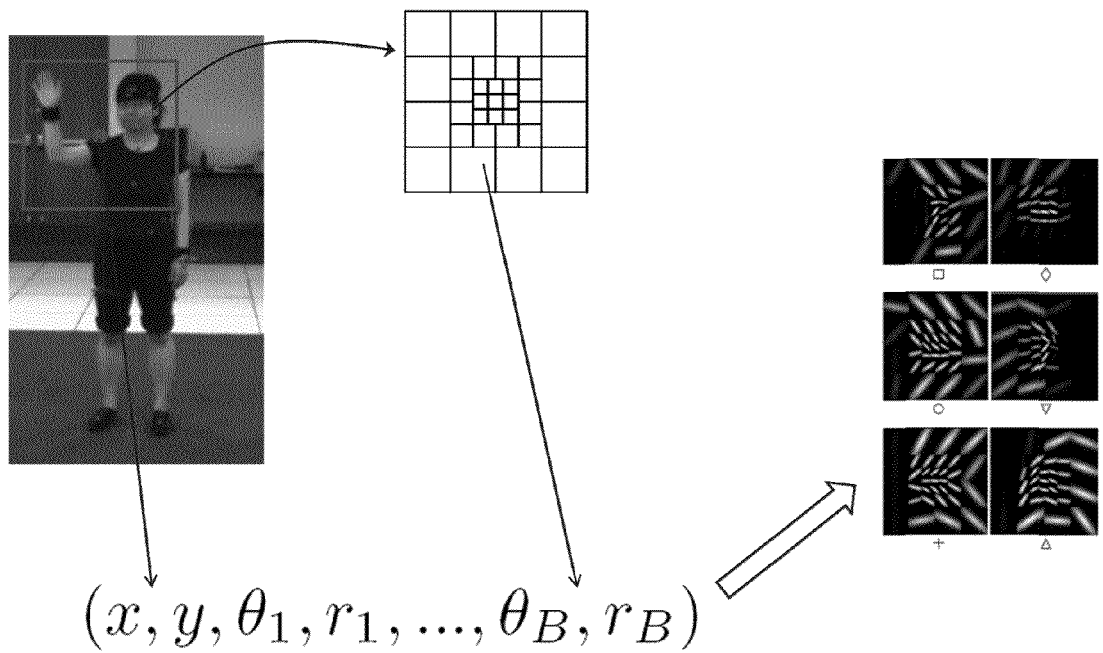
FIG. 2 shows an exemplary diagram showing more details the extracting Appearance and Position Context (APC) descriptors (12 and 22 of FIG. 1).

FIG. 2 shows an exemplary diagram for extracting the APC descriptors. The dominant orientation of the gradients is used to extract the APC descriptors. In FIG. 2, the APC descriptor 12 or 22 is extracted in the following steps. (1) For each image, the human window is detected and resealed to a fixed size. (2) Centered at each point that has large gradient in the human window, the local region is partitioned into log-polar sectors (top row at FIG. 3), making the descriptor more sensitive to positions of nearby sample points than to those far away. (3) Suppose from inner to outer, the sectors are numbered 1, 2, ..., B, and $\theta_i, m_i$ is the orientation and magnitude of the dominant gradient in sector i. Then the local descriptor is represented as $(x, y, \theta_1, r_1, \ldots, \theta_B, r_B)$ where x, y is the relative position in the human window and, $r_i = m_1/m_i$ is the normalized magnitude that basically removes the contrast of the image.

In one implementation, the log-polar sectors are approximated by rectangular cells so that fast computation is allowed by integral histograms. The bottom row at FIG. 3 left view is an exemplary partition. The size of the local region is chosen to exactly cover the average length of human limbs. To calculate the dominant gradient, an orientation histogram is computed for each cell where the votes are weighted by the gradient magnitude and interpolated bilinearly between neighboring histogram entries. The dominant gradient corresponds to the maximum histogram entry.

The descriptor is inspired by the shape context (SC) descriptor proposed by in the aspect of capturing co-occurrence information in local regions. The SC descriptor has been successfully applied to human pose estimation by Agarwal and Triggs, but such a silhouette-based representation is prone to left-right ambiguities and cannot be applied to the cases where background subtraction is unavailable. While the instant descriptor encodes richer information to disambiguate hard poses, and requires no background subtraction. The present descriptor also outperforms the sparse SIFT descriptor in testing accuracy due to that (1) our descriptor encodes the relative position x, y that helps to locate the local structures and experiments show that it makes a significant contribution to the accurate estimation; (2) the partition is larger enough to capture the context information; and (3) the descriptor utilizes the dominant gradient, instead of the entire histogram, in each cell, which suppresses noise and enables invariance.

Bag-of-Words

Figure 3:
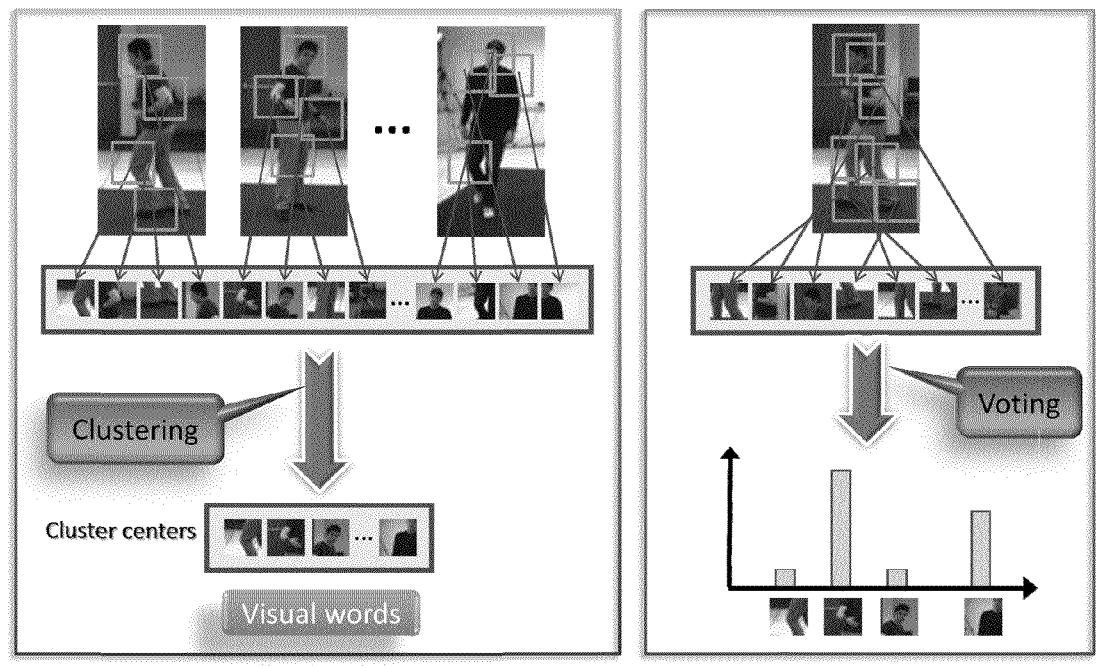
FIG. 3 shows an exemplary diagram for determing bag-of-words (BoW).

FIG. 3 shows an exemplary diagram for determing the bag-of-words (BoW). Through an image database, from each image, the system can extract a set of descriptors to generate a descriptor pool. The descriptor pool is clustered by any suitable clustering algorithm. The cluster centers are saved as visual words 14. The visual words capture the most common patterns in the image database. For any new image, the system can also extract a set of descriptors 12. These descriptors 12 are softly voted with respect to the visual words 14 to generate a histogram of the descriptors. The histogram is used to represent the image. This is the bag-of-words representation.

Figure 4:
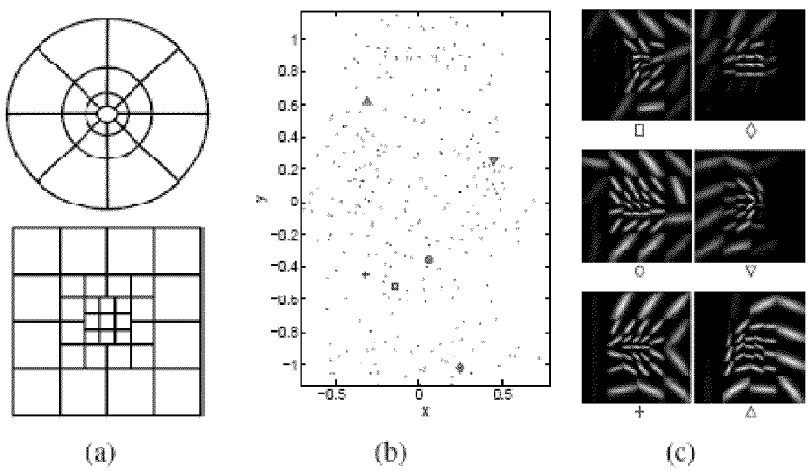
FIGS. 4(a)-(c) show more details on an exemplary bag of word determination.

FIGS. 4(a)-(c) show more details on an exemplary bag of word determination. FIG. 4(a) shows a partition of local descriptor region where the top diagram is the log-polar partition and the bottom diagram is a rectangular partition. FIG. 4(b) shows the x, y values (relative positions) of K visual words—it has a human shape. FIG. 4(c) shows six sample visual words. The dominant orientations whose magnitudes are resealed by their learned metrics are drawn with their corresponding x, y marked in FIG. 4(b). From left to right and top to down, their marks in FIGS. 4(b) and (c) are □, ◆, ○, ∇, +, and ∆, respectively, and their represented local structures are belt knee, ankle, bent knee, bent elbow, bent knee, and shoulder, respectively.

In one embodiment, the bag-of-words model is initially obtained by an unsupervised method as most of the previous work did. First, the APC descriptors extracted from all training images are clustered by K-means, and the K cluster centers, called visual words, form a set $C=\{c_1,c_2,\ldots,c_K\}$ that is the so called codebook. FIG. 4(b) shows the x, y values (relative positions) of all visual words that forms a human shape, i.e., the visual words basically cover the key points of the human images. FIG. 4(c) gives six sample visual words that are typical local structures. For each visual word, we draw the dominant orientations whose magnitudes are resealed by their learned metrics. Their x, y coordinates are marked in FIG. 4(b).

After the codebook is available and given a testing image I and its APC descriptor set $D=\{d_1,d_2,\ldots d_m\}$, each descriptor votes softly with respect to the visual words. The bag-of-words representation, denoted as x, is the accumulating scores of all descriptors. The i-th element $x_i$ of x is:

$$x_i = \frac{1}{|D|}\sum_{d \in D} e^{-\rho^2(c_i,d,A_i)}, \ i=1,2,\ldots,K \quad (1)$$

where $\rho(c,d,A)=\sqrt{(c-d)^T A(c-d)}$, and A is positive semi-definite, i.e., $A \geq 0$, parameterizing a family of Mahalanobis distance.

Conventionally, $A_i$'s are empirically chosen. In the present system, $A_i$'s are obtained from the labeled image-to-pose data through a supervised learning process.

Joint Learning of Metrics and BME

As mentioned above, the visual words obtained by an unsupervised method may lack discriminative power for those problems that deal with subtle differences such as pose estimation. Thus, the visual words are obtained through a supervised learning process so as to make them particularly informative to the specific problem of pose estimation. This is done by learning a seperate distance metric for each visual word from the labeled image-to-pose pairs. More specifically, the visual words are initially obtained by an unsupervised algorithm, and then the system jointly learns the distance metrics and the BME model through a supervised learning process.

Bayesian Mixtures of Experts

The image-to-pose relation is highly non-linear. Close observation of human images shows that human appearance changes very fast as the human global orientation changes, while the appearance changes relatively slowly in a fixed orientation. Therefore, the image-to-pose distribution in a fixed orientation can be well modelled by a single or a combination of linear regressor(s). The system uses the Bayesian mixtures of experts (BME) to model the multi-modal image-to-pose distributions. If x is the bag-of-words representation of the image and y is the human pose, the model with M experts is:

$$p(y \mid x, \Theta) = \sum_{i=1}^{M} g(x, v_i) p(y \mid x, T_i, \Lambda_i) \quad (2)$$

where $$g(x, v_i) = \frac{e^{v_i^T x}}{\sum_j e^{v_j^T x}} \quad (3)$$

$$p(y \mid x, T_i, \Lambda_i) \sim N(T_i x, \Lambda_i) \quad (4)$$

Here $\Theta=\{v_i,T_i,\Lambda_i | i=1,2,\ldots,M\}$ consists of the parameters of the BME model. $p(x|y,T_i,\Lambda_i)$ is an Gaussian distribution with mean $T_i$ and covariance matrix $\Lambda_i$, and it is an expert that transforms the input into output prediction. Then the predictions from different experts are combined in a probabilistic mixture model. Note that the mixing proportions of the experts, $g(x,v_i)$, are input dependent and normalized to 1 by the softmax construction. They reflect the distributions of the outputs in the training set. They work like gates that can competitively switch-on multiple experts for some input domains, allowing multi-modal conditionals. They can also pick a single expert for unambiguous inputs by switching-off other experts.

The parameter $\Theta$ can be estimated by maximum likelihood $$L = \sum_k \ln p(y^{(t)} \mid x^{(t)}, \Theta) \quad (5)$$

where $(x^{(t)},y^{(t)})$ are labeled image-to-pose pairs. This can be achieved through an expectation-maximization (EM) algorithm. The EM algorithm that learns the BME model may converge to a suboptimal local maximum, and the quality of the final solution depends largely on the initial values. Therefore, as known to one skilled in the art and discussed in Ning et al., "Efficient initialization of mixtures of experts for human pose estimation", Proceedings of the IEEE International Conference on Image Processing, 2008, the content of which is incorporated by reference, initialization of $\Theta$ is important for a good estimation.

In one BME Learning by EM embodiment, the parameter $\Theta$ of the BME model can be estimated by maximum likelihood $$L = \sum_k \ln p(x^{(t)} \mid y^{(t)}, \Theta)$$

where $(x^{(t)},y^{(t)})$ are labeled image-to-pose pairs. This can be achieved through an EM algorithm. Interested readers are referred to.

E-step. Denote $\theta_i = \{T_i, \Lambda_i\}$. For the labeled pairs $(x^{(t)}, y^{(t)})$, compute $$h_i^t = \frac{g(x^{(t)}, v_i^{(k)}) p(y^{(t)} | x^{(t)}, T_i^{(k)}, \Lambda_i^{(k)})}{\sum_j g(x^{(t)}, v_j^{(k)}) p(y^{(t)} | x^{(t)}, T_j^{(k)}, \Lambda_j^{(k)})} \quad (6)$$

$$Q_i^m(\theta_i) = \sum_t h_i^t \ln p(y^{(t)} | x^{(t)}, T_i^{(k)}, \Lambda_i^{(k)}), \ i = 1, \ldots, M \quad (7)$$

$$Q^g(v) = \sum_t \sum_i h_i^t \ln g(x^{(t)}, v_i^{(k)}) \quad (8)$$

where $h_i^t$ computes the probability that expert i has generated data point t.

M-step. Find a new estimate $\Theta^{(k+1)} = \{\{\Theta_i^{(k+1)}\}_{i=1}^M, v^{(k+1)}\}$ with $$\theta_i^{(k+1)} = \arg\max_{\theta_i} Q_i^m(\theta_i), \ i = 1, \ldots, M \quad (9)$$

$$v^{(k+1)} = \arg\max_v Q^g(v) \quad (10)$$

Learning Distance Metrics for Visual Words

Visual words are typically learned by unsupervised clustering methods. They represent the most frequent patterns existing in the entire training images, so they contain much information unrelated to the specific problem of human pose estimation. This information may introduce nontrivial errors since pose estimation requires to deal with subtle differences.

In one embodiment of the present invention, a supervised learning process is used to suppress the unrelated information so as to make the visual words particularly informative to the specific problem. On the other hand, the basic mechanism of bag-of-words involves a step of voting the local descriptors to the visual words according to the distances between the descriptors and the visual words. Eqn. 1 gives a softmax voting. And the distance metrics $\{A_i\}_{i=1}^K$ of the Mahalanobis distance in Eqn. 1) are equivalent to a rescaling of the visual words that replace each visual word c with $A^{1/2}c$ and applying the standard Euclidian distance to the rescaled visual words. Therefore, the visual word can be rescaled to suppress unrelated information by learning a separate metric for each visual word from the labeled image-to-pose pairs. FIG. 4(c) gives six sample visual words that are typical informative local structures. For each visual word, the dominant orientations whose magnitudes are rescaled are drawn by their learned metrics.

The metric learning is jointly optimized with the learning of BME model by an iterative gradient ascent algorithm. Let $= \{A_i\}_{i=1}^K$ consisting of metrics for all visual words. Suppose the parameter set $\Theta$ is currently available for the BME model $p(y|x, \Theta)$, and the visual words are initially obtained by K-means. Then a simple way of defining a criterion for the desired metrics is to demand that the BME model gives maximum log-likelihood on the training data. This gives the optimization problem:

$$\max_A H(A) = \ln p(y | x, \Theta) - \xi \sum_{i=1}^K \|I - A_i\|^2 \quad (6)$$

$$\text{s.t. } A_i \geq 0, \ i = 1, \ldots, K. \quad (7)$$

Here H(A) is the objective function, and $$-\xi \sum_{i=1}^K \|I - A_i\|^2$$

is a penalty that constrains $A_i$ to approach diagonal as much as possible so as to reduce the complexity of the metric $A_i$. The penalty term also prevents A from drifting too much. We use a gradient ascent step to optimize H(A), $$\Delta_{A_i} H(A) = \frac{1}{p} \frac{\partial p}{\partial x_i} \frac{\partial x_i}{\partial A_i} + 2\xi(I - A_i), \ i = 1, \ldots, K \quad (8)$$

where $x_i$, the i-th element of x, is defined in Eqn. 1. We take derivatives on $x_i$, instead of x, because $x_j$ is independent of $A_i$ when $j \neq i$. The BME model $p(y|x,\Theta)$ is differentiable with respect to $x_i$ because both the experts and gates g are differentiable. $\partial x_i / \partial A_i$ is computed by differentiating Eqn. 1:

$$\frac{\partial x_i}{\partial A_i} = \frac{1}{|D|} \sum_{\in} e^{-\rho^2(c_i, d, A_i)}(c_i - d)(c_i - d)^T \quad (9)$$

where D is the set of APC descriptors, and $c_i$ is the i-th visual word.

A gradient step is taken $A_i := A_i + \alpha \Delta_{A_i} H(A)$ to update $\{A_i\}_{i=1}^K$, and then project $A_i$ onto the set $A_i = P\{A | A \geq 0\}$ to ensure that the constraint $A_i \geq 0$ holds, $$A_i := \arg\min_{A'} \{\|A' - A_i\|_F | A' \in P\} \quad (10)$$

The projection step onto P is done by first finding the decomposition $A_i = VSV^T$ where $S = \text{diag}(\lambda_1, \ldots, \lambda_n)$ is $A_i$'s eigenvalues and the columns of V contains $A_i$'s eigenvectors, and then taking $A' = VS'V^T$ where $S' = \text{diag}(\max\{\lambda_1, 0\}, \ldots, \max\{\lambda_n, 0\})$. After obtaining the metrics $\{A_i\}_{i=1}^K$, the process re-estimates the parameters for the BME model using the new metrics, and this procedure is repeated until convergence. This gives the Algorithm 1 that jointly learns the metrics and the BME model as follows:

---
Algorithm 1. Joint Learning of Metrics and BME

---
1: Initialization: $A_i \leftarrow I, i = 1, \ldots, K$
2: repeat
3:    Estimate $\Theta$ for the BME model using EM
4:    repeat
5:      for each input-output pair (x, y) do
6:        $A_i := A_i + \alpha \Delta_{A_i} H(A), i = 1, \ldots, K$
7:        $A_i := \arg\min_{A'} \{\|A' - A_i\|_F | A' \in P\}$
8:      end for
9:    until convergence
10: until convergence

---

Until now, only on-line learning—taking one input-output pair (x, y) for each iteration. The process can be extended to batch learning by putting all training samples in the objective function, i.e., $$H(A) = \sum_t \ln p(y^{(t)}|x^{(t)}, \Theta) - \xi \sum_{i=1}^{K} \|I - A_i\|^2.$$

The on-line learning is used because it is much faster. This framework of jointly learning metrics can also be extended to other tasks where bag-of-words representation is used, such object recognition, as long as the cost function is differentiable with respect to $\{A_i\}_{i=1}^{K}$ (e.g., BME and least-square-error).

Figure 5:
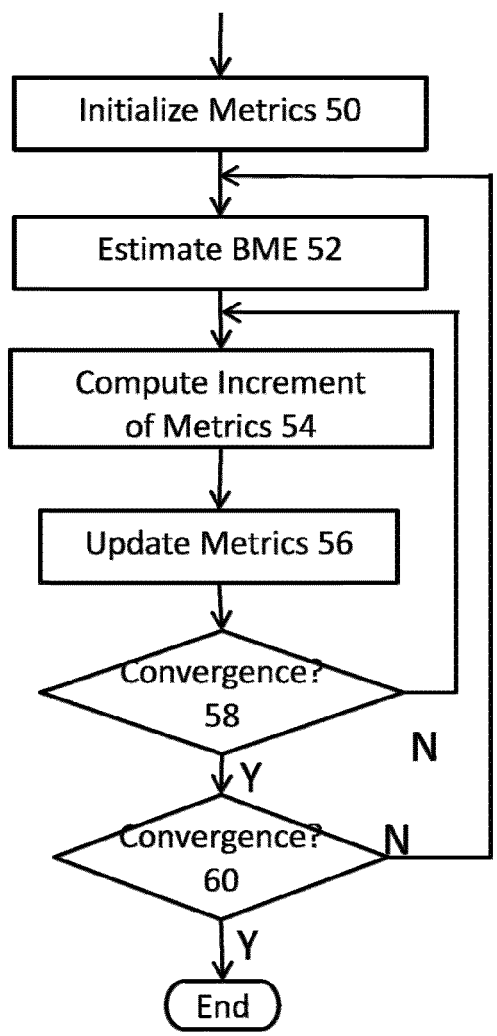
FIG. 5 shows in more detail the exemplary process 16 of FIG. 1.

FIG. 5 shows in more detail the exemplary process 16 of FIG. 1. The process of FIG. 5 implements Algorithm 1 to jointly learn metrics with the BME. First, the metrics are initialized (50). Next, a BME is estimated (52). A metric increment is determined (54) and the metrics are updated (56). The process checks to see if the metric learning converges (58). If not, the metric is updated (54-56) until convergence is achieved. Once the metric learning converges, the process loops back to step 52 to check for BME learning convergence (60). Once the BME learning converges, the process exits.

Inference

After the BME model and distance metrics are ready, inference (state prediction) is straightforward using Eqn. 2. Giving a testing image, we extract the APC descriptors and compute the bag-of-words representation x by Eqn. 1. Eqn. 2 takes x as input, and the output is a conditional mixture distributions with components and mixing proportions that are input-dependent.

Figure 6:
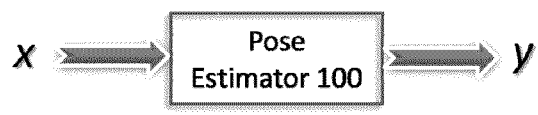
FIG. 6 shows an exemplary pose estimator.

FIG. 6 shows an exemplary pose estimator 18. In this case, x is an image observation, and y is a human pose. P models the image-to-pose distribution. It has a set of parameters θ. The parameter θ is learned from training data by maximizing the log-likelihood of the training data. The image-to-pose distribution P is our pose estimator. It is a discriminative mapping from image observations to human poses.

Testing

A human pose estimation method is verified as robust and reliable only if it is tested and achieves reasonable performance on a labeled database that is large enough to cover the variations of pose, background, illumination, clothes, body shapes, hair style, and so on. However, collecting realistic pose labeled human databases with large variations is extremely difficult and expensive. And the current available databases are usually captured in engineered environments with few variations. Therefore, a quasi-synthetic human database was constructed by animating the computer graphic human avatars using real motion data and placing the synthetic images on real background. The database contains various human actions, consisting of about 132,000 labeled samples, much larger and more complex than the previous quasi-synthetic datasets. The system has also been tested with the database HumanEva with good performance.

Figure 7:
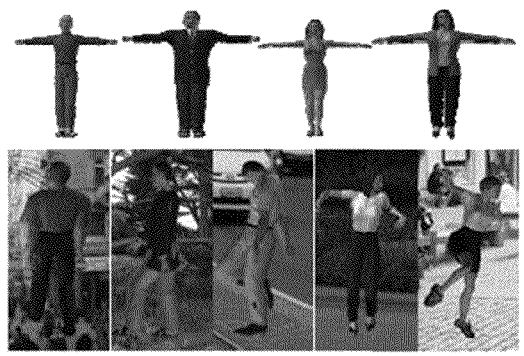
FIG. 7 shows a quasi-synthetic test dataset.

FIG. 7 shows a quasi-synthetic test dataset. FIG. 7 left side image shows exemplary avatars with varying clothes, body shapes, and hair style. FIG. 7 right side block, shows exemplary sample synthetic human images where only the human region is cropped out. The test database includes about 376 computer graphic avatars with varying clothes, body shapes, and hair style (left side image of FIG. 7 shows various sample avatars), and collected a background image pool covering natural, indoor, and street scenes. The 3D human pose has 52 degrees of freedom (DOF), 1 for global orientation and 51 for 17 joints (each upper limb has 4 joints, lower limb has 3, and chest, neck, and head has one, respectively). For each human action, angles, avatars, lighting conditions, and backgrounds, were randomly chosen. The commercial software Poser was used to synthesize a human motion video. FIG. 7, ridht side block, provides sample images. The dataset contains various human actions, consisting of about 131,468 labeled samples. For testing, only samples with the global orientation and one angle of each joint with the biggest variation were selected.

The experiment set up selects 60% sequences of the dataset for training and 40% of the sequences are left for testing. The human detector proposed is run on each image in the dataset to detect the bounding box of the human in the image. Then APC descriptors are extracted inside the bounding boxes. Both human detector and APC descriptor require no background subtraction. The human regions in the bounding boxes have misalignments in some challenging images (this is common for currently available human detectors). The bag-of-words representation can handle this problem because it is invariant to translation. But the misalignment may pose difficulties on other holistic features like HOG. A codebook of 200 visual words was trained, and used 8 experts for the BME model. Table 1 shows the result:

TABLE I

AVERAGE RMS ERROR IN DEGREES OVER ALL ANGLES FOR FOUR SETTINGS: (1) FULL APPROACH, (2) NO x, y (RELATIVE POSITIONS) IN APC DESCRIPTORS BUT WITH METRIC LEARNING, (3) NO METRIC LEARNING BUT WITH x, y INFORMATION, AND (4) USING SIFT INSTEAD OF APC DESCRIPTORS.

|  | full | no x, y | no metric | SIFT |
|---|---|---|---|---|
| error | 6.04° | 7.08° | 7.67° | 6.97° |

The mean (over all 52 angles or an individual angle) RMS absolute difference errors between the true and estimated joint angle (vectors), in degrees are determined as follows:

$$D(,') = \frac{1}{m}\sum_{i=1}^{m} |(y_i - y_i') \bmod \pm 180°|. \quad (11)$$

The performances were tested on four settings: (1) full approach, (2) no x, y (relative positions) in APC descriptors but with metric learning, (3) no metric learning but with x, y information, (4) using SIFT instead of APC descriptors. Table 2 gives the average RMS errors over all angles for the four settings. FIG. 1 shows the RMS error of each individual angle normalized by the range of variation of that angle. In FIG. 1, we select only the global orientation and one angle of each joint with the biggest variation for better displaying. Table 2 and FIG. 1 show that the full approach achieves the best performance, having about 17% relative improvement. This demonstrates that the learned metrics, the APC descriptor, and the encoded position information (x, y) make a significant contribution to the pose recovery.

From Table 1, the average RMS error over all angles of our full approach is 6.04°, but the error for individual joint angle varies depending on the range and discernibility of each joint angle. The RMS errors obtained for some key body angles are listed as follows, with that the ranges of variation of these angles in the test set are given in parentheses: global orientation: 19.65° (360°), right shoulder angle: 5.77° (34.27°), and left hip: 9.03° (45.26°). Our performance are numerically comparable to that in (see lower part of Table 1 in) and in (see FIG. 8 in). But both and are based on near perfect background substraction (on their quasi-synthetic datasets), while our APC descriptors are extracted from images with cluttered background.

TABLE 2

Comparison of pose estimation errors on the walking sequences. The table gives the mean and standard deviation of the relative $L_2$ error norm.

| Algorithm | Mean | Standard Deviation | Time(s) |
|---|---|---|---|
| Zhou (Walking) | 0.303 | 0.075 | 40.55 |
| Bissacco (Walking) | 0.274 | 0.116 | 3.28 |
| Embodiment of Invention (Walking) | 0.241 | 0.158 | 0.21 |

TABLE 3

Average RMS error over all joints and over only global orientation, for sequences of walking, boxing, jogging, and combination of the three.

| Sequence | Walking | Box | Jog | Combine |
|---|---|---|---|---|
| Ave RMS | 6.68° | 5.50° | 4.12° | 6.17° |
| Global | 5.75° | 7.20° | 5.93° | 6.67° |

The system was also tested on a real human motion dataset—HumanEva—made publicly available by the Brown Group. The dataset was captured simultaneously using a calibrated marker-based motion capture system and multiple high-speed video capture systems. The video and motion capture streams were synchronized by software. It contains multiple subjects performing a set of predefined actions with repetition. To facilitate comparison with other state of the art methods, the first experiment uses only the walking sequences having a total of 2950 frames (first trial of subject S1, S2, and S3), as did. All of the images are taken from a single camera (C1) because the instant approach recovers human pose from a single view. The HumanEva dataset was originally partitioned into training, validation, and testing sub-sets. Walking sequences were used in the original training sub-set for training and those in the original validation sub-set for testing. The original testing sub-set is not used because motion data were not provided for the test.

The original motion data provided by HumanEva includes (x, y, z) locations of the body parts in the world coordinate system. There is a total of 10 parts: torso, head, upper and lower arms, and upper and lower legs. The internal parameters of the human body model (like limb length) were discarded, and the (x, y, z) locations were converted to global orientation of torso and relative orientation of adjacent body parts. Each orientation is represented by 3 Euler angles. The human region of each image is automatically cropped out by the human detector. Given a set of APC descriptors with the associated joint angles, the system trained a codebook of 200 visual words, learn a separate metric for each visual word, and learn a BME model with 8 experts to represent the image-to-pose distribution.

To facilitate comparison, the system normalized the joint angle trajectories so that y is a zero-mean unit variance process. In this way, each angle in y contributes equally to the error function. We use the relative $L_2$ error norm. Table 2 shows the mean and standard deviation of the relative $L_2$ pose error norms on the walking sequences. The instant approach outperforms the other state of the art algorithms in estimation accuracy. And the computational speed of the instant approach is 15 times faster than previous work [Bissacco et al] thanks to the integral histograms used in APC descriptor extraction and fast inference of human pose by the discriminative model (BME).

Figure 8:
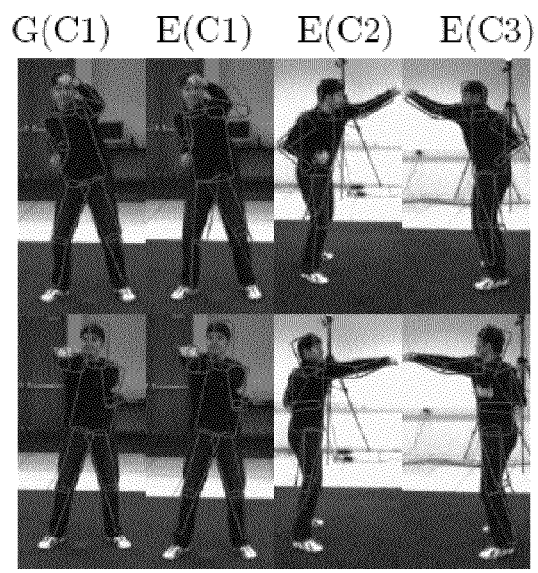
FIG. 8 shows exemplary estimation results of pose estimation on the HumanEva dataset.
Figure 8:
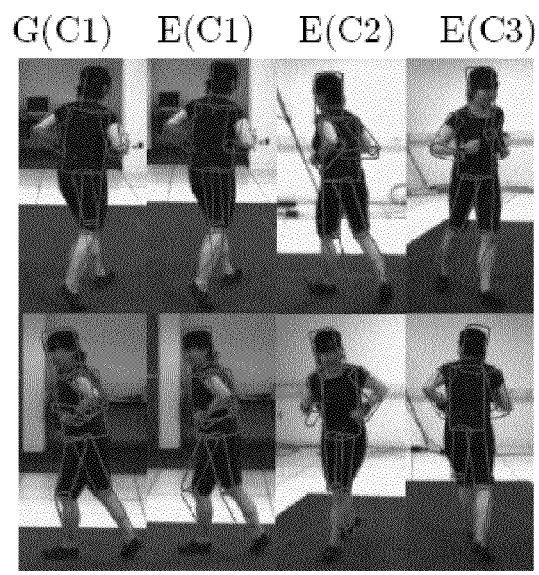

FIG. 8 shows exemplary pose estimation results for two sets of activities in HumanEva dataset. Each column S1, S2 or S3 shows the provided ground truth projected to camera C1 and estimation projected to cameras: C1, C2 and C3. Each row corresponds to a frame in that action sequence. G: ground truth; E: estimation.

Although the present system does not employ any temporal information in human pose recovery for three reasons: (1) temporal information is unavailable for still images; (2) employing temporal information in pose estimation requires much extra computation cost that is a nontrivial challenge to our final goal of human action recognition; and (3) temporal smoothness can be easily achieved after the pose sequence is estimated. However, the inventors contemplate that estimation accuracy can be significantly improved if temporal information is employed as in.

In sum, the system robustly handles 3D human pose estimation from monocular images using a discriminative bag-of-words approach. A supervised approach to learn a separate distance metric for each visual word, and the learned metrics rescale the visual words to better represent the frequent patterns existing in images that are particularly useful for the specific problem of pose estimation. The metric learning and BME model are jointly optimized by an iterative gradient ascent algorithm. A local descriptor (APC) is used that achieves both selectivity and invariance for the purpose of pose estimation and requires no background subtraction. The system has been tested on both a quasi-synthetic dataset and a real dataset (HumanEva) and achieved a performance better than, or at least comparable to other state of the art approaches.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. A method to determine a 3D human pose, comprising:
   a. learning visual words for human pose estimation through a supervised method;
   b. deriving a separate metric for each visual word from labeled image-to-pose pairs through supervised learning;
   c. representing a multi-modal distribution of the 3D human pose space conditioned on a feature space with a Bayesian mixture of experts (BME) model; and
   d. jointly optimizing metric learning and the BME model by an iterative gradient ascent process.

2. The method of claim 1, comprising obtaining visual words by an unsupervised clustering operation.

3. The method of claim 1, comprising learning an individual distance metric for each visual word.

* * * * *